United States Patent
Dhotre et al.

(10) Patent No.: US 11,015,751 B2
(45) Date of Patent: May 25, 2021

(54) TOOLLESS FLEXIBLE CONDUIT CONNECTOR AND METHOD OF USING THE SAME

(71) Applicant: Sigma Electric Manufacturing Corporation, Garner, NC (US)

(72) Inventors: Anand Chandrakant Dhotre, Maharashtra (IN); Vinayak Manohar Chavan, Maharashtra (IN)

(73) Assignee: SIGMA ELECTRIC MANUFACTURING CORPORATION, Garner, NC (US)

( * ) Notice: Subject to any disclaimer, the term of this patent is extended or adjusted under 35 U.S.C. 154(b) by 185 days.

(21) Appl. No.: 16/418,368

(22) Filed: May 21, 2019

(65) Prior Publication Data

US 2019/0360621 A1    Nov. 28, 2019

Related U.S. Application Data

(60) Provisional application No. 62/675,579, filed on May 23, 2018.

(51) Int. Cl.
*F16L 33/12*    (2006.01)

(52) U.S. Cl.
CPC .................................. *F16L 33/12* (2013.01)

(58) Field of Classification Search
CPC ........ F16L 33/12; F16L 21/08; H02G 3/0691; H02G 3/083; H02G 3/0658; H02G 3/0666; H02G 3/0683
USPC .................... 285/154.1, 154.4, 311, 312, 309
See application file for complete search history.

(56) References Cited

U.S. PATENT DOCUMENTS

| | | | | |
|---|---|---|---|---|
| 1,750,257 A | * | 3/1930 | Bonnell | H02G 3/0691 285/154.3 |
| 1,796,846 A | * | 3/1931 | Kanner | H02G 3/0691 285/217 |
| 1,967,006 A | * | 7/1934 | Eccles | H02G 3/0683 285/154.3 |
| 2,258,365 A | * | 10/1941 | Mills | H02G 3/0658 174/51 |
| 2,508,476 A | * | 5/1950 | Stecher | H02G 3/0683 285/154.3 |
| 6,791,031 B1 | * | 9/2004 | Manning | H02G 3/065 174/659 |
| 7,004,512 B2 | | 2/2006 | Antonelli et al. | |
| 7,125,056 B2 | | 10/2006 | Saarem | |
| 7,576,290 B1 | | 8/2009 | Korcz | |

(Continued)

*Primary Examiner* — David Bochna
(74) *Attorney, Agent, or Firm* — Cantor Colburn LLP

(57) ABSTRACT

A conduit connector comprising: a body comprising a receiving end and a connecting end, wherein the body comprises a first fixing element and a second fixing element extending from the body at the receiving end, wherein the first fixing element comprises a first slot; wherein the second fixing element comprises a second slot and a groove; a clamp having a clamp channel and a tang; wherein the clamp extends through the first slot, and through the second slot; wherein the tang engages the groove; and a lever having a pin extending between sides of the lever, wherein each side of the lever has a front edge and back edge; wherein the pin is adjacent the back edge of each side of the lever; wherein the lever can be moved from an open position to a closed position which causes a decrease in a distance between the first fixing element and the second fixing element.

14 Claims, 4 Drawing Sheets

(56) References Cited

U.S. PATENT DOCUMENTS

| | | | |
|---|---|---|---|
| 7,824,213 B1 | 11/2010 | Korcz et al. | |
| 7,828,340 B2 | 11/2010 | Heelan et al. | |
| 8,201,852 B2 | 6/2012 | Linhorst et al. | |
| 8,371,623 B2 | 2/2013 | Bronnert | |
| 8,426,733 B1 | 4/2013 | Cunningham et al. | |
| 8,791,374 B1 | 7/2014 | Smith | |
| 9,373,919 B1* | 6/2016 | Smith | H02G 3/0683 |
| 9,640,966 B1 | 5/2017 | Smith | |
| 2010/0285699 A1* | 11/2010 | Auray | F16L 5/00 |
| | | | 439/816 |
| 2011/0101687 A1 | 5/2011 | Heelan et al. | |
| 2012/0024597 A1* | 2/2012 | Jafari | H02G 3/0691 |
| | | | 174/665 |
| 2015/0031231 A1 | 1/2015 | Smith | |
| 2020/0381908 A1* | 12/2020 | Smith | H02G 3/0683 |

* cited by examiner

TOOLLESS FLEXIBLE CONDUIT CONNECTOR AND METHOD OF USING THE SAME

CROSS REFERENCE TO RELATED APPLICATIONS

This application is a non-provisional of and claims priority to U.S. Application Ser. No. 62/675,579, filed May 23, 2018, which is incorporated herein by reference in its entirety.

BACKGROUND

The present disclosure relates to conduit connectors for connecting a conduit to a junction box, and especially relates to toolless flexible conduit connectors.

Electricians need tools to install connectors to an electrical junction box or other enclosure and a conduit. Use of tools takes time. Accordingly, resulting installation costs are increased.

What is needed are connectors to a junction box and a conduit that do not require tools for installation at either end, i.e., at the box end and at the conduit end. Accordingly, without the use of any tools, installation time can be reduced and installation costs can be decreased.

BRIEF DESCRIPTION

Disclosed herein are conduit connectors and methods for use thereof

In one embodiment, a conduit connector comprises: a body comprising a receiving end for receiving a conduit and a connecting end for connecting to a junction box; a clamp coupled to the body at the receiving end; and a lever coupled to the clamp, wherein the lever is moveable to change a diameter of the receiving end, and secure the conduit in the receiving end.

In another embodiment, a conduit connector comprises: a body comprising a receiving end and a connecting end with a body channel extending therebetween, wherein the receiving end is for receiving a conduit, and the connecting end is configured for connecting to a junction box, wherein the body comprises a first fixing element and a second fixing element extending from the body at the receiving end, away from the body channel, wherein the first fixing element comprises a first slot; wherein the second fixing element comprises a second slot and a groove; wherein the groove is located on a side of the second fixing element opposite the first fixing element; a clamp having a clamp channel formed at a first end, and a tang extending from a second end toward a first end, with a clamp body between the first end and the second end; wherein the clamp extends through the first slot, between the first fixing element and the second fixing element, and through the second slot; wherein the tang engages the groove; and a lever having a pin extending between sides of the lever, wherein each side of the lever has a front edge and back edge; wherein the pin is adjacent the back edge of each side of the lever, and the front edge of each side of the lever extends away from the pin a lever distance DL; wherein the lever can be moved from an open position to a closed position which causes a decrease in a distance between the first fixing element and the second fixing element.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

Figure 1:
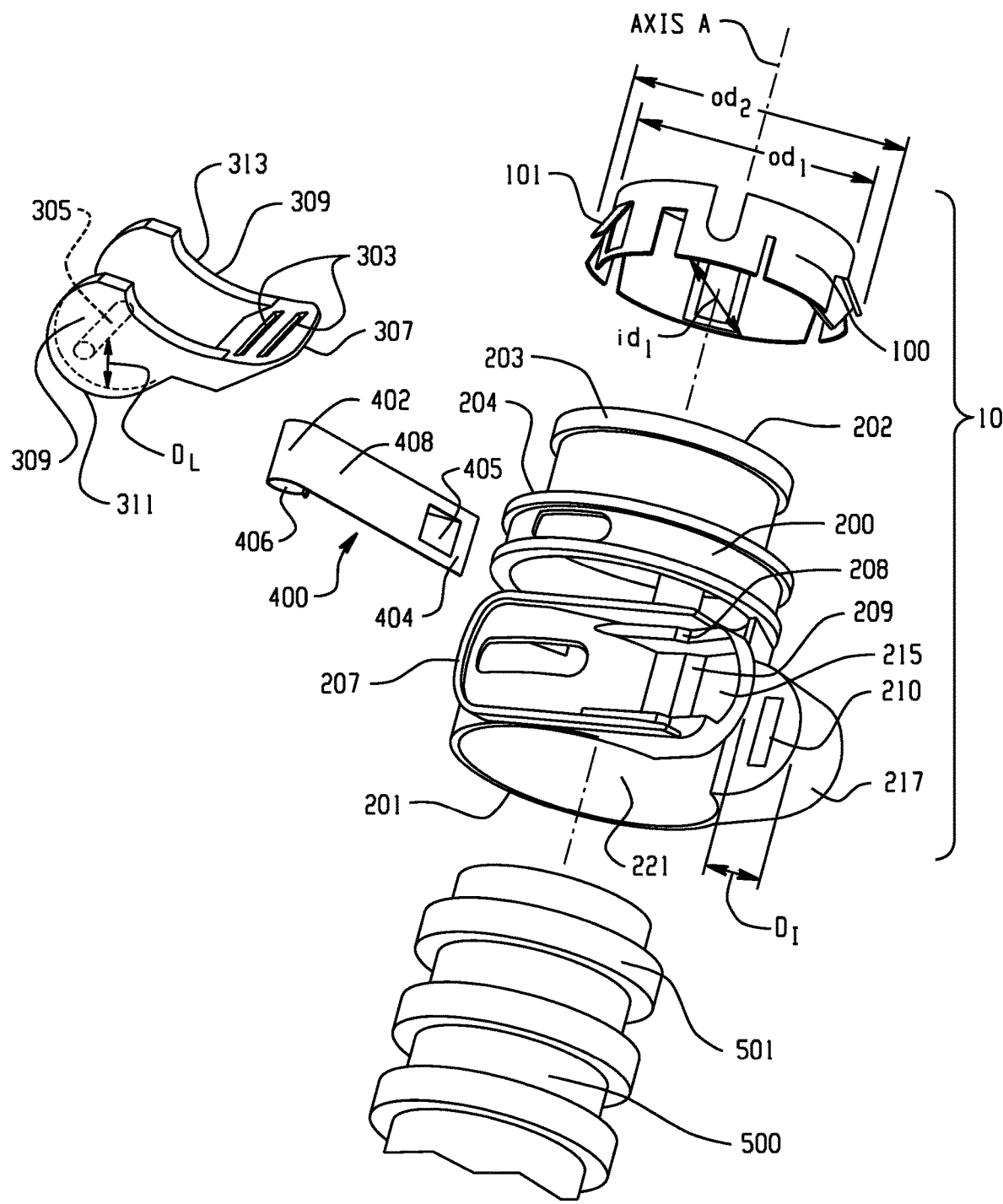
FIG. 1 is an expanded view of an embodiment of a conduit connector and a conduit.

Disclosed herein is a conduit connector that can be attached to an electrical conduit and to an electrical junction box or other enclosure without the use of tools. The conduit connector enables quick installation without any tool at either end, i.e. at the junction box end (also referred to as the connecting end) and at the conduit end (also referred to as the receiving end). For example, the conduit connector comprises a snap engagement on the connecting end and pivoted lever squeeze engagement at the receiving end. This design, which requires no tool to install, can reduce installation time and therefore, installation costs.

Referring now to the figures, which are exemplary and not intended to limit the scope hereof. A more complete understanding of the components, processes, and apparatuses disclosed herein can be obtained by reference to the accompanying drawings. These figures (also referred to herein as "FIG(S)., FIGURE(S)") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates an expanded view of an embodiment of a conduit connector 10 with a conduit 500. The conduit connector 10 comprises a body 200 with a receiving end 201 and a connecting end 202. Extending through the body 200 is a body channel 221, configured to receive the conduit 500. The conduit connector 10 can comprise tangs 101 configured to engage an inner surface of a junction box (not shown). For example, the conduit connector 10 can comprise a spring 100 disposed at the connecting end 202.

The spring 100 can comprise two or more tangs 101 that extend away from the body 200. A distance between outermost portions of the tangs 101 extending away from the body 200, in the resting (also referred to as open) position, also referred to herein as a tang diameter ($od_2$), is greater than the spring outer diameter ($od_1$). The tang diameter ($od_2$) is greater than a junction box opening diameter. The tangs 101 are flexible and capable of being compressed to reduce the tang diameter $od_2$ to a diameter that is less than the junction box opening diameter and thereby allow insertion of the connecting end 202 into a junction box during use.

The connecting end 202 can comprise first lip 203 extending outward (e.g., in a direction perpendicular to an axis A in which the body channel 221 extends from the receiving end 201). The first lip 203 can extend outward from the end of connecting end 202 a distance greater than an inner spring diameter ($id_1$), and can retain spring 100 on the connecting end 202 (i.e., prevent the spring 100 from dislodging from the connecting end 202). Second lip 204, which is located between the first lip 203 and the receiving end 201 and which extends outward from the connecting end 202 a distance greater than the junction box opening diameter, can inhibit movement of spring 100 toward receiving end 201. The distance between the first lip 203 and the second lip 204 is sufficient to allow the spring 100 to be located therebetween and to allow the tangs 101 to be in the open position when the conduit connector is attached to a junction box.

The body channel 221 extends along the axis A from the receiving end through the connecting end 202. Projecting from an inner surface of the body 200 into the body channel 221 is a stop 206. (See FIG. 3) The stop 206 extends a sufficient distance into the body channel 221 such that when the conduit 500 is disposed in the body 200 through the receiving end 201, an outer surface of the conduit 500, contacts the stop 206. For example, the stop 206 can engage the rib 501 of the conduit 500, preventing further extension into the body 200.

Extending from the body 200 at the receiving end 201 in a direction away from the axis A are first fixing element 215 and second fixing element 217. The first fixing element and the second fixing element 217 can receive clamp 400 at the receiving end 201. In particular, the clamp 400 can pass through first slot 209 in the first fixing element 215 and second slot 210 in the second fixing element 217, with first end 402 of the clamp 400 protruding from the first slot 209 and second end 404 of the clamp 400 protruding from the second slot 210.

The clamp 400 has a tang 405 at the second end 404 and a clamp channel 406 (e.g., a furrow or loop) at the first end 402. The clamp channel 406 forms a pivot point for a lever 300 which connects to the clamp 400 at the clamp channel 406. A pin 305 on the lever 300, can extend through the clamp channel 406, connecting the clamp 400 and lever 300 together. The clamp channel 406 can be any design that allows the clamp 400 to securely engage the pin 305 and allow the first end 307 of the lever 300 to move from an open position (illustrated in FIG. 4) to a closed position (illustrated in FIG. 3) where the first end 307 is adjacent to and/or within protective edge 207 of the first fixing element 215.

The tang 405 at the second end of the clamp 400 extends away from the clamp 400 and toward the first end 402. In use, the clamp 400 extends from the first end 402 which is connected to the lever 300 through the first slot 209 in the first fixing element 215, between the fixing elements 215, 217, and through the second slot 210 in the second fixing element. The second end 404 can extend through the slot and into the second fixing element such that the tang 405 engages a groove 211 (see FIG. 2) of the second fixing element 217, thereby securing the lever and clamp to the body 200.

The first fixing element 215 can optionally have a protective edge 207 extending away from the body and capable of receiving the front edge of the lever 300. The second fixing element 217 can optionally have a protective wall 212 extending away from the first fixing element 215, and forming a cavity. Optionally, the cavity can have a size such that when the tang 405 engages the groove 211, the clamp 400 does not extend past the protective wall 212.

Figure 2:
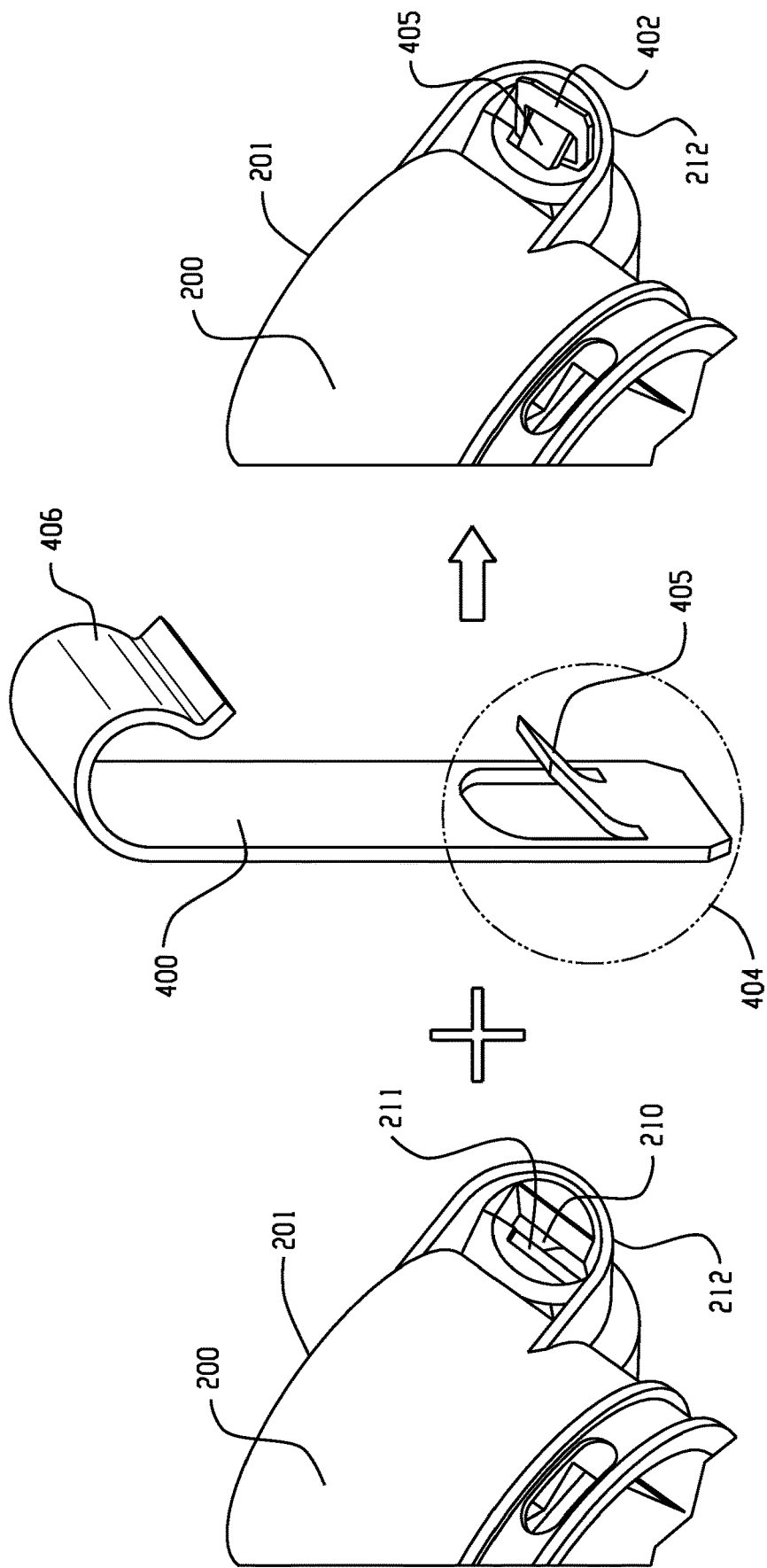
FIG. 2 is a partial view of an embodiment of the body of the conduit connector of FIG. 1 and the clamp.

FIG. 2 illustrates the second end 404 secured to the body 200 through the second slot 210 in the second fixing element 217. Within the cavity formed by the protective wall 212, the body can comprise a groove 211. The tang 405 can engage the groove 211 and lock the clamp 400 into position.

The lever 300 has sides 309, with the pin 305 extending between opposite sides 309. The pin 305 is located adjacent to a back edge 311 of the side 309. The front edge 313 of each side 309 extends away from the pin 305 a lever distance $D_L$. As the lever is moved from the open position to the closed position, the rounded front edge of each side 309 contacts the surface of the first fixing element 215, causing the pin 305 to move away from the first fixing element 215. Since the clamp 400 secures the lever 300 to the second fixing element 217, the movement of the pin 305 away from the first fixing element 215, causes relative movement between the fixing elements 215, 217, pulling the clamp body 408 toward and through the first slot 209, reducing the distance between the fixing elements 215, 217. The fixing elements 215, 217 are initially separated by an initial distance $D_I$, i.e., when the lever is in the open position. Once the fixing elements 215, 217 have been moved closer together by the movement of the lever 300 into the closed position, the fixing elements 215, 217 are separated by a final distance $D_F$. The lever distance $D_L$ is represented by the formula:

$$D_L = D_I - D_F$$

As shown in FIG. 1, an end portion of the lever 300 can comprise one or more slots 303, which can be used to move the lever from the closed position into the open position. For example, a tool (e.g., such as a screw driver) can be inserted in one or more of the slots 303 and adjusting the tool can move the lever to the open position. Movement from the close position to the open position will allow the fixing elements 215, 217 to separate from one another, increasing the distance therebetween. Thereafter, the conduit 500 can be removed from the receiving end 201.

Figure 4:
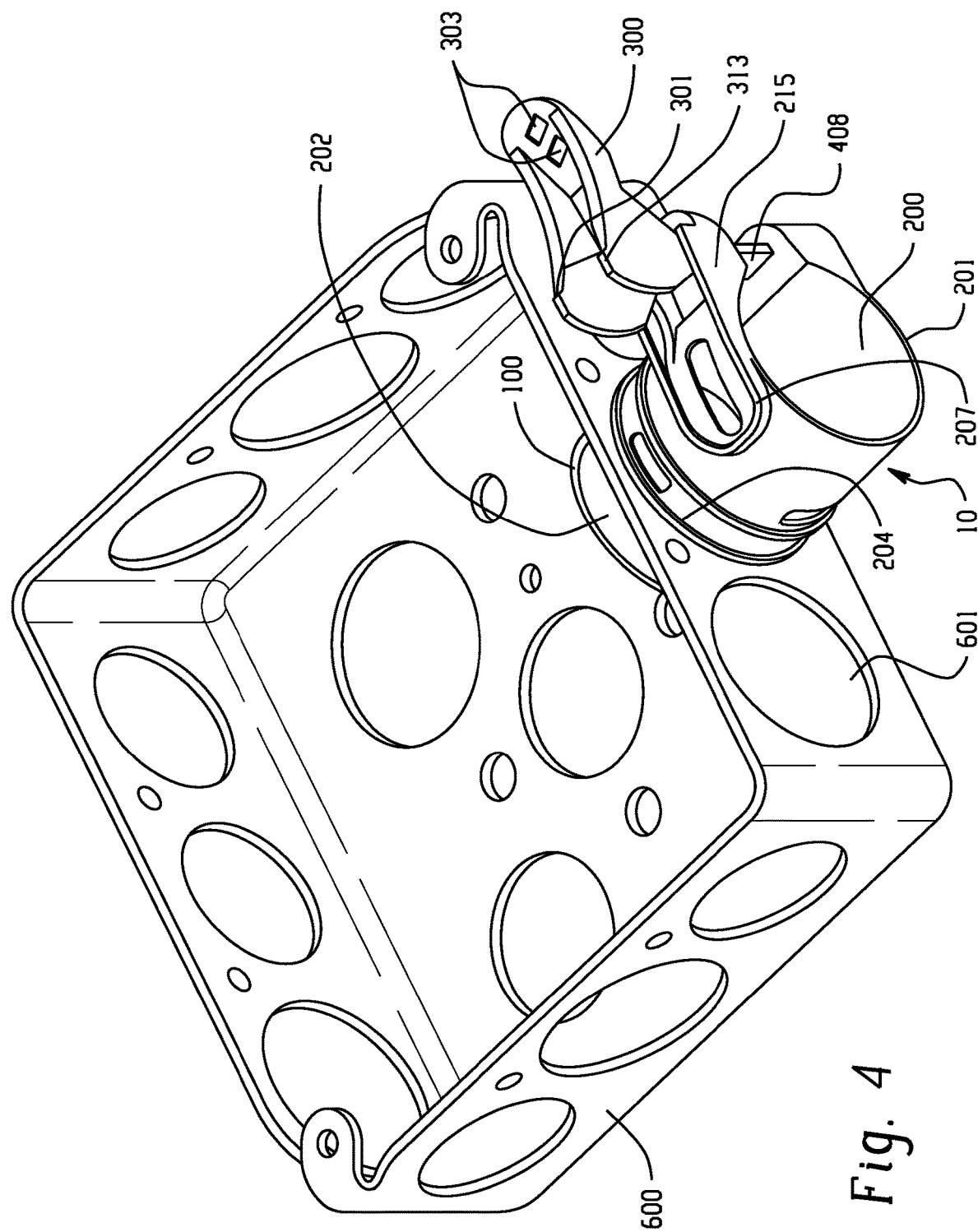
FIG. 4 is a perspective view of an embodiment of the conduit connector of FIG. 1 attached to a junction box.

Optionally, the first fixing element 215 can include an element locking feature 208, and the lever 300 can include a corresponding lever locking feature 301 (see FIG. 4). When the lever 300 is in the closed position, the element locking feature 208 can be engaged with the lever locking feature 301 to secure the lever 300 in the closed position. For example, the element locking feature 208 can be a groove configured to engage the lever locking feature 301 in the form of a protrusion. Moving or pivoting the lever 300 to the open position can disengage the element locking feature 208 from the lever locking feature 301.

Figure 3:
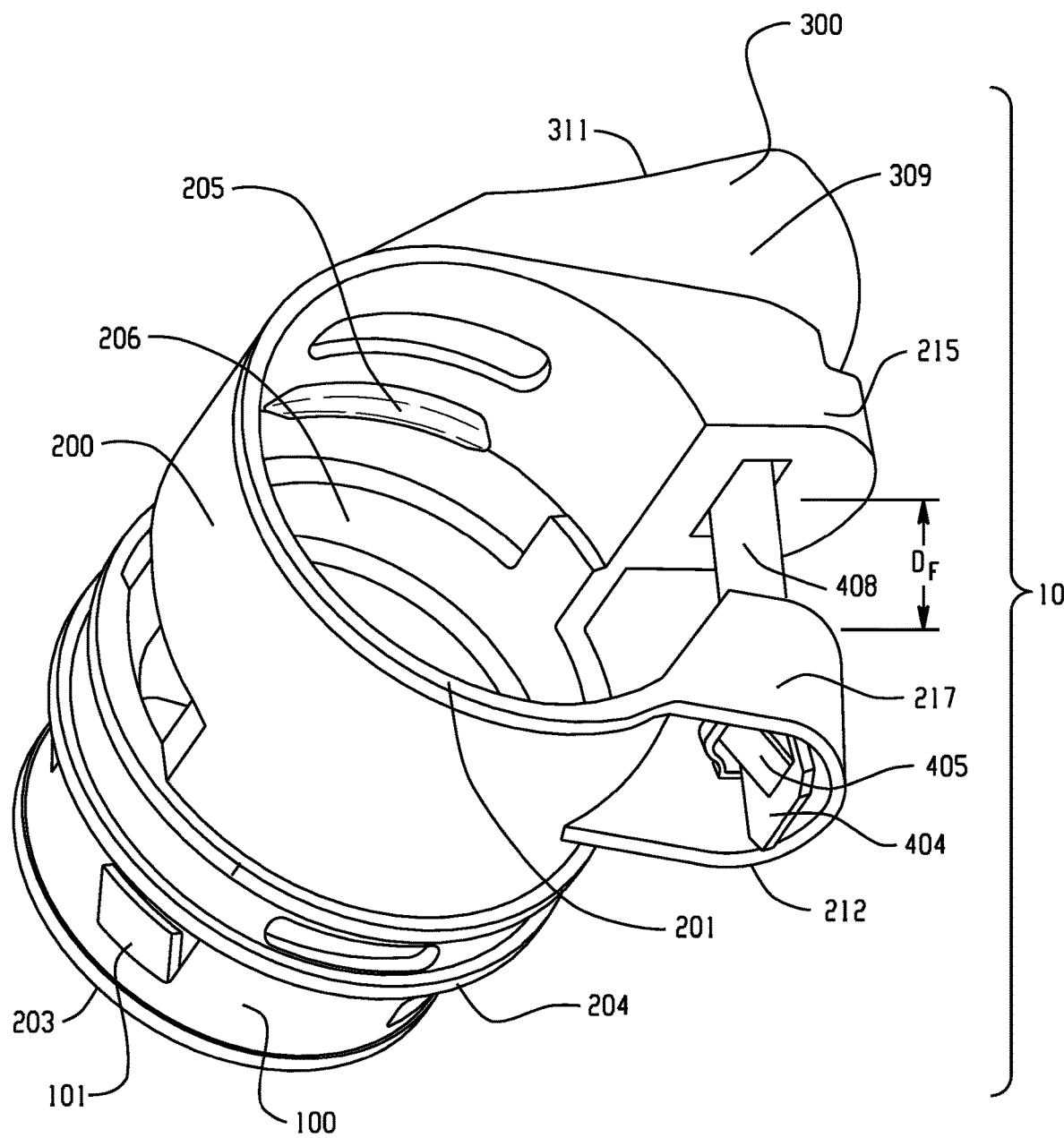
FIG. 3 is a perspective view of an embodiment of the conduit connector of FIG. 1 with the clamp attached to the body and the lever in the closed position.

FIG. 3 illustrates a rear perspective view of an embodiment illustrating additional features of the conduit connector 10. Optional inside projection 205 of the body 200 can be configured to engage rib 501 (see FIG. 1) on conduit 500. The inside projection 205 can extend in between the ribs 501, and the conduit 500 can be retained within the body 200 and prevented from being dislodged from the body 200. The inside projection 205 can be formed along a portion of the inner circumference of the body 200 as shown in FIG. 3 or can be formed along an entirety of the inner circumference of the body 200. For example, multiple projections 205 can be formed, such as opposing projections 205. When a conduit is located in the body channel 221, the lever can be closed to decrease the distance between the first fixing element 215 and the second fixing element 217, and thereby to decrease the inner diameter of the body 200 at the receiving end 201. A decrease in the inner diameter of the body 200 causes a decrease in the distance between the inner surface of the body 200 at the receiving end and the conduit. Therefore, the conduit 500 can be secured in the receiving end 201 by application of pressure on an exterior of the conduit 500 from the inner surface of the body 200 at the receiving end. Alternatively or in addition, a decrease in the inner diameter of the body 200 can cause the distance between the inside projection(s) 205 and the conduit 500 to decrease so that the inside projection(s) 205 can inhibit removal of the conduit 500 from the body channel 221.

FIG. 4 illustrates a view of an embodiment of the conduit connector 10 installed to junction box 600 through opening 601 in the junction box 600. The second lip 204 can have a diameter greater that the diameter of the opening 601 and can prevent the conduit connector 10 from further entering the junction box 600.

When the conduit connector 10 is attached to a junction box 600, the connecting end 202 is inserted through the opening 601. As the spring 100 passes through the opening 601, the tangs 101 bend toward the body 200, decreasing the tang diameter ($od_2$) to a diameter that is less than the diameter of the opening 601, thereby allowing the connecting end 202 and the tangs 101 to pass through the opening 601. Once the tangs 101 have passed through the opening 601, they spring back to their open position, returning to tang diameter ($od_2$) which is greater than the diameter of the opening 601. Therefore, the tangs 101 can engage an inner surface of the junction box 600 to prevent the inadvertent removal or dislodging of the conduit connector 10 from the junction box 600.

The conduit connector 10 can be formed of various materials as appropriate for the particular element. For example, the conduit connector 10 can be formed of various materials such as metals, plastics, alloys, and so forth, such as zinc, titanium, steel, brass, malleable iron, aluminum, and so forth, as well as combinations comprising at least one of the foregoing materials. In embodiments, each of the spring 100 and the clamp 400 can comprise a material such as steel (e.g., spring steel and/or stainless steel). The body 200 can be formed of a plastic, such as engineering plastics. The lever 300 can be formed of a plastic, such as engineering plastics, or can comprise a metal or metal alloy, such as zinc, aluminum, steel, as well as combinations comprise at least one of the foregoing (e.g., zinc alloy, aluminum alloy, and/or steel alloy).

A user can install the conduit 500 to the conduit connector 10 before or after the conduit connector 10 is installed to the junction box 600. With respect to installation of the conduit 500 to the conduit connector 10, the user inserts the conduit 500 into the body channel 221 of the body 200 of the conduit connector 10 through the receiving end 201. The conduit 500 can be inserted into the body channel 221 until contacting the stop 206. The user then moves or pivots the lever 300 from the open position to the closed position, moves the clamp 400 and decreases the diameter of the receiving end 201, securing the conduit 500 in the receiving end 201.

The conduit connectors disclosed herein enable facile installation of a conduit to a junction box without the use of tools. They also enable readjustment of the conduit in the body channel, or the removal of the conduit from the body channel with the use of a simple tool.

This disclosure further encompasses the following Aspects.

Aspect 1: A conduit connector comprising a body comprising a receiving end for receiving a conduit and a connecting end for connecting to a junction box; a clamp coupled to the body at the receiving end; and a lever coupled to the clamp, wherein the lever is moveable to change a diameter of the receiving end, and secure the conduit in the receiving end.

Aspect 2: A conduit connector comprising: a body comprising a receiving end and a connecting end with a body channel extending therebetween, wherein the receiving end is for receiving a conduit, and the connecting end is configured for connecting to a junction box, wherein the body comprises a first fixing element and a second fixing element extending from the body at the receiving end, away from the body channel, wherein the first fixing element comprises a first slot; wherein the second fixing element comprises a second slot and a groove; wherein the groove is located on a side of the second fixing element opposite the first fixing element; a clamp having a clamp channel formed at a first end, and a tang extending from a second end toward a first end, with a clamp body between the first end and the second end; wherein the clamp extends through the first slot, between the first fixing element and the second fixing element, and through the second slot; wherein the tang engages the groove; and a lever having a pin extending between sides of the lever, wherein each side of the lever has a front edge and back edge; wherein the pin is adjacent the back edge of each side of the lever, and the front edge of each side of the lever extends away from the pin a lever distance $D_L$; wherein the lever can be moved from an open position to a closed position which causes a decrease in a distance between the first fixing element and the second fixing element.

Aspect 3: The conduit connector of any of the preceding aspects, wherein the front edge of each side of the lever is a rounded front edge, and wherein moving the lever to the closed position moves the pin away from the first fixing element, pulling the clamp through the first slot.

Aspect 4: The conduit connector of any preceding aspects, wherein the first fixing element and the second fixing element are initially separated by an initial distance $D_I$ when the lever is in the open position, wherein the first fixing element and the second fixing element are separated by a final distance $D_F$ when the lever is in the closed position, and wherein the distance $D_L$ is represented by the formula: $D_L = D_I - D_F$.

Aspect 5: The conduit connector of any preceding aspects, wherein the body further comprises an inside projection extending from the body into the body channel such that when a conduit is in the body channel and the lever is in the closed position, the inside projection inhibits removal of the conduit from the body channel.

Aspect 6: The conduit connector of any preceding aspects, wherein the first fixing element comprises a body locking feature and the lever comprises a lever locking feature on the front edge of each side of the lever, wherein the locking feature of the body is configured to engage with the locking feature of the lever when the lever is in the closed position.

Aspect 7: The conduit connector of any preceding aspects, wherein the second fixing element has a wall extending away from the first fixing element, and forming a cavity, and wherein the cavity has a size such that when the tang engages the groove, the clamp does not extend beyond the cavity.

Aspect 8: The conduit connector of any of the preceding aspects, wherein a first end of the lever comprises a slot.

Aspect 9: The conduit connector of any preceding aspect, wherein the connecting end comprises a spring around the connecting end, wherein the spring comprises tangs protruding away from the connecting end, and wherein a distance between outermost portions of the tangs protruding away from the connecting end is greater than a diameter of an opening in the junction box.

Aspect 10: The conduit connector of aspect 9, wherein the connecting end comprises a first lip with a diameter greater than a diameter of the spring and a second lip with a diameter greater than the opening in the junction box, and wherein the spring is located between the first lip and the second lip.

Aspect 11: A method of connecting a conduit to a junction box, the method comprising: inserting an end of the conduit through the receiving end the conduit connector of any of the preceding aspects and into the body; moving the lever to the closed position and securing the conduit in the body; and introducing a connecting end of the conduit connector to an opening in the junction box such that the connecting end extends through the opening, into the junction box.

Aspect 12: The method of Aspect 11, wherein securing the conduit in the receiving end comprises applying pressure on an exterior of the conduit from an interior of the body.

Aspect 13: The method of any of Aspects 11-12, wherein securing the conduit in the receiving end comprises engaging the inside projection of the body with an exterior of the conduit.

Aspect 14: The method of any of Aspects 11-13, wherein securing the conduit in the receiving end comprises engaging the element locking feature with the lever locking feature.

Aspect 15: The method of any of Aspects 11-14, further comprising: inserting a tool in the slot at the end portion of the lever; adjusting the tool to move the lever from the closed position to the open position; and moving the conduit.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A conduit connector comprising:
    a body comprising a receiving end and a connecting end with a body channel extending therebetween, wherein the receiving end is for receiving a conduit, and the connecting end is configured for connecting to a junction box, wherein the body comprises a first fixing element and a second fixing element extending from the body at the receiving end, away from the body channel, wherein the first fixing element comprises a first slot; wherein the second fixing element comprises a second slot and a groove; wherein the groove is located on a side of the second fixing element opposite the first fixing element;
    a clamp having a clamp channel formed at a first end, and a tang extending from a second end toward a first end, with a clamp body between the first end and the second end; wherein the clamp extends through the first slot, between the first fixing element and the second fixing element, and through the second slot; wherein the tang engages the groove; and
    a lever having a pin extending between sides of the lever, wherein each side of the lever has a front edge and back edge; wherein the pin is adjacent the back edge of each side of the lever, and the front edge of each side of the lever extends away from the pin a lever distance $D_L$;
    wherein the lever can be moved from an open position to a closed position which causes a decrease in a distance between the first fixing element and the second fixing element.

2. The conduit connector of claim 1, wherein the front edge of each side of the lever is a rounded front edge, and wherein moving the lever to the closed position moves the pin away from the first fixing element, pulling the clamp through the first slot.

3. The conduit connector of claim 1, wherein the first fixing element and the second fixing element are initially separated by an initial distance $D_I$ when the lever is in the open position, wherein the first fixing element and the second fixing element are separated by a final distance $D_F$ when the lever is in the closed position, and wherein the distance $D_L$ is represented by the formula:

$$D_L = D_I - D_F.$$

4. The conduit connector of claim 1, wherein the body further comprises an inside projection extending from the body into the body channel such that when the conduit is in the body channel and the lever is in the closed position, the inside projection inhibits removal of the conduit from the body channel.

5. The conduit connector of claim 1, wherein the first fixing element comprises an element locking feature and the lever comprises a lever locking feature on the front edge of each side of the lever, wherein the element locking feature is configured to engage with the lever locking feature when the lever is in the closed position.

6. The conduit connector of claim 1, wherein the second fixing element has a wall extending away from the first fixing element, and forming a cavity, and wherein the cavity has a size such that when the tang engages the groove, the clamp does not extend beyond the cavity.

7. The conduit connector of claim 1, wherein a first end of the lever comprises a slot.

8. The conduit connector of claim 1, wherein the connecting end comprises a spring around the connecting end, wherein the spring comprises tangs protruding away from the connecting end, and wherein a distance between outermost portions of the tangs protruding away from the connecting end is greater than a diameter of an opening in the junction box.

9. The conduit connector of claim 8, wherein the connecting end comprises a first lip with a diameter greater than a diameter of the spring and a second lip with a diameter greater than the opening in the junction box, and wherein the spring is located between the first lip and the second lip.

10. A method of connecting a conduit to a junction box, the method comprising:

inserting an end of the conduit through the receiving end the conduit connector of claim 1 and into the body;

moving the lever to the closed position and securing the conduit in the body; and introducing a connecting end of the conduit connector to an opening in the junction box such that the connecting end extends through the opening, into the junction box.

11. The method of claim 10, wherein securing the conduit in the receiving end comprises applying pressure on an exterior of the conduit from an interior of the body.

12. The method of claim 10, wherein securing the conduit in the receiving end comprises engaging the inside projection of the body with an exterior of the conduit.

13. The method of claim 10, wherein securing the conduit in the receiving end comprises engaging the element locking feature with the lever locking feature.

14. The method of claim 10, further comprising inserting a tool in the slot at the end portion of the lever;

adjusting the tool to move the lever from the closed position to the open position; and moving the conduit.

* * * * *